(12) United States Patent
Lawry et al.

(10) Patent No.: US 7,873,450 B2
(45) Date of Patent: Jan. 18, 2011

(54) SYSTEM AND METHOD FOR AN INTEGRATED INTERFACE FOR SYSTEMS ASSOCIATED WITH LOCOMOTIVE OPERATION

(75) Inventors: Brian D. Lawry, Erie, PA (US); Ajith Kuttannair Kumar, Erie, PA (US)

(73) Assignee: General Electric Company, Schenectady, NY (US)

(*) Notice: Subject to any disclaimer, the term of this patent is extended or adjusted under 35 U.S.C. 154(b) by 930 days.

(21) Appl. No.: 11/743,329

(22) Filed: May 2, 2007

(65) Prior Publication Data

US 2008/0092079 A1 Apr. 17, 2008

Related U.S. Application Data

(60) Provisional application No. 60/829,569, filed on Oct. 16, 2006.

(51) Int. Cl.
*G06F 19/00* (2006.01)
*G01M 17/08* (2006.01)

(52) U.S. Cl. .................... 701/33; 701/35; 701/19; 340/438

(58) Field of Classification Search ............... None
See application file for complete search history.

(56) References Cited

U.S. PATENT DOCUMENTS

| | | | |
|---|---|---|---|
| 5,065,321 A | 11/1991 | Bezos et al. | |
| 5,185,700 A | 2/1993 | Bezos et al. | |
| 5,555,171 A * | 9/1996 | Sonehara et al. | 701/33 |
| 5,890,080 A * | 3/1999 | Coverdill et al. | 701/29 |
| 6,487,478 B1 * | 11/2002 | Azzaro et al. | 701/24 |
| 6,553,290 B1 * | 4/2003 | Pillar | 701/33 |
| 6,676,229 B1 | 1/2004 | Marra et al. | |
| 6,853,890 B1 | 2/2005 | Horst et al. | |
| 6,886,472 B2 * | 5/2005 | Jammu et al. | 105/26.05 |
| 2004/0024502 A1 * | 2/2004 | Squires et al. | 701/33 |
| 2005/0205720 A1 * | 9/2005 | Peltz et al. | 246/187 A |
| 2007/0173989 A1 * | 7/2007 | Walker | 701/19 |

* cited by examiner

*Primary Examiner*—Michael J. Zanelli
(74) *Attorney, Agent, or Firm*—Robert Wawrzyn, Esq.; Terry M. Sanks, Esq.; Beusse Wolter Sanks Mora & Maire, P.A.

(57) ABSTRACT

An integrated interface system is provided for a plurality of systems associated with locomotive operation. The integrated interface system includes a main controller with a main display and an interface between each system and the main controller. Each interface is configured to communicate a respective set of time-dependent diagnostic information for each system to the main controller.

27 Claims, 3 Drawing Sheets

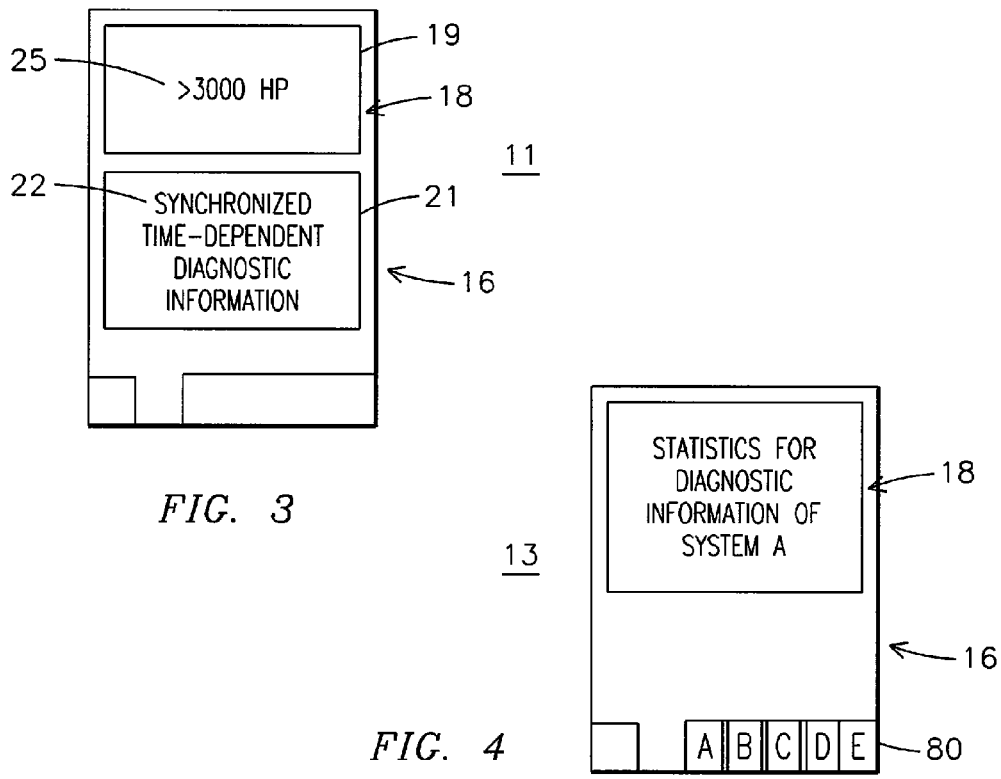
FIG. 3
FIG. 4
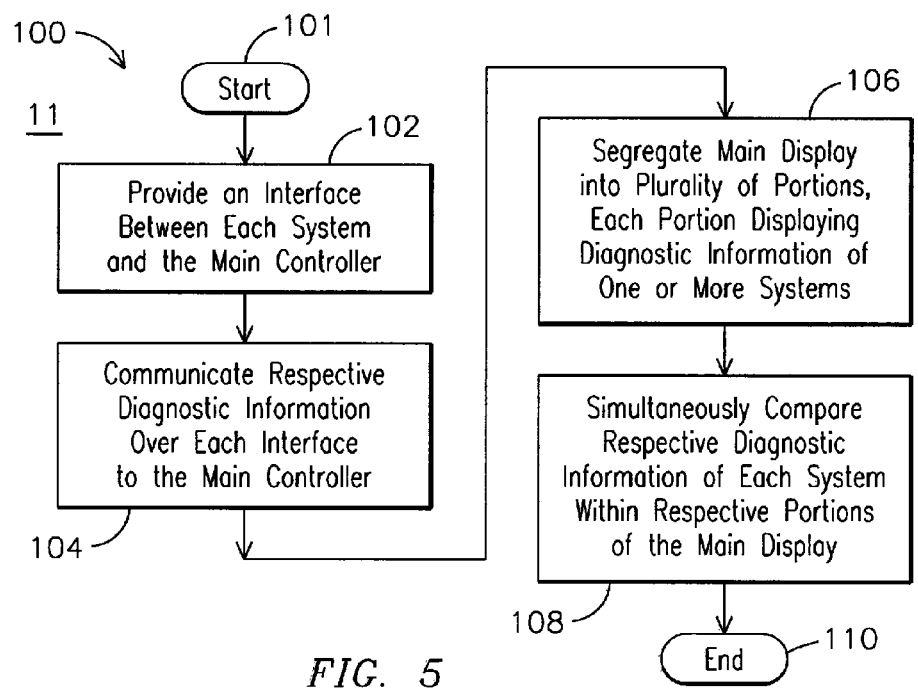
FIG. 5

SYSTEM AND METHOD FOR AN INTEGRATED INTERFACE FOR SYSTEMS ASSOCIATED WITH LOCOMOTIVE OPERATION

CROSS-REFERENCE TO RELATED APPLICATIONS

This application claims priority to U.S. Provisional Application No. 60/829,569 filed on Oct. 16, 2006, and incorporated by reference herein.

FIELD OF THE INVENTION

The field of the invention relates to locomotives, and more particularly, to a system, method and computer readable media for an integrated interface for systems associated with locomotive operation.

BACKGROUND OF THE INVENTION

Upon purchasing a locomotive from a manufacturer, the customer may customize the locomotive with supplemental third party systems installed by a third-party vendor in addition to those pre-existing locomotive systems installed by the locomotive manufacturer. Additionally, subsequent systems may be added in the near future, such as railroad systems to supplement operation of the locomotive. Such locomotive, railroad and third party systems may include individual displays which receive time-dependent diagnostic information from their respective systems.

During operation of the locomotive, the locomotive operator regularly travels between each locomotive and third party system to monitor each system's time-dependent diagnostic information on their respective display. In the event of a suspected malfunction of a locomotive and/or third party system, the third-party vendor travels between each locomotive and/or third party system to separately investigate their respective time-dependent diagnostic information, and frequently collaborates with the locomotive manufacturer before finally attempting to diagnose the source of the malfunction.

The time-dependent diagnostics from each of the locomotive, railroad and third party systems is currently not temporally synchronized to assess the effect of one system on another, such as during a system malfunction, for example. The inventors have recognized that it would be particularly helpful to provide temporal synchronization of each locomotive, railroad and third party system during operation and diagnosis of a system malfunction. Accordingly, the inventors have recognized there is a need to increase the efficiency in diagnosing such suspected malfunctions of locomotive, railroad and third party systems, and to minimize the need to travel between each system to diagnose the source of the malfunction after the occurrence of a malfunction. Additionally, each railroad and third party display of a locomotive includes a respective display. Accordingly, it would be advantageous, both in terms of cost and spatial efficiency, to provide a single display capable of selectively displaying the diagnostic information for each railroad and third party system.

BRIEF DESCRIPTION OF THE INVENTION

In one embodiment of the present invention, an integrated interface system is provided for a plurality of systems associated with locomotive operation. The integrated interface system includes a main controller including a main display, and an interface between each system of the plurality of systems and the main controller. Each interface is configured to communicate a respective set of time-dependent diagnostic information for each system of the plurality of systems to the main controller.

In another embodiment of the present invention, a method is provided for interfacing a plurality of systems associated with locomotive operation to a main controller of a locomotive. The method includes providing an interface between each of the plurality of systems and the main controller including a main display. The method further includes communicating a respective set of time-dependent diagnostic information for each system of the plurality of systems over each interface to the main controller.

In another embodiment of the present invention, computer readable media containing program instructions are provided for interfacing a plurality of systems associated with locomotive operation to a main controller of a locomotive. The computer readable media includes a computer program code for communicating a respective set of time-dependent diagnostic information for each system of the plurality of systems over each interface to the main controller, where each interface is positioned between each system of the plurality of systems and the main controller including a main display. The computer readable media further includes a computer program code for segregating the main display into a plurality of portions, where each portion respectively displays synchronized time-dependent diagnostic information for at least one system of the plurality of systems. The compute readable media further includes a computer program code for simultaneously comparing the respective synchronized time-dependent diagnostic information of each at least one system of the plurality of systems within respective portions of the main display.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings, in which:

FIG. 3 is an exemplary embodiment of the integrated interface system of FIG. 1;

FIG. 4 is an exemplary embodiment of the integrated interface system of FIG. 2;

FIG. 5 is a flow chart illustrating an embodiment of a method for an integrated interface system of FIG. 1.

DETAILED DESCRIPTION OF THE INVENTION

Figure 1:
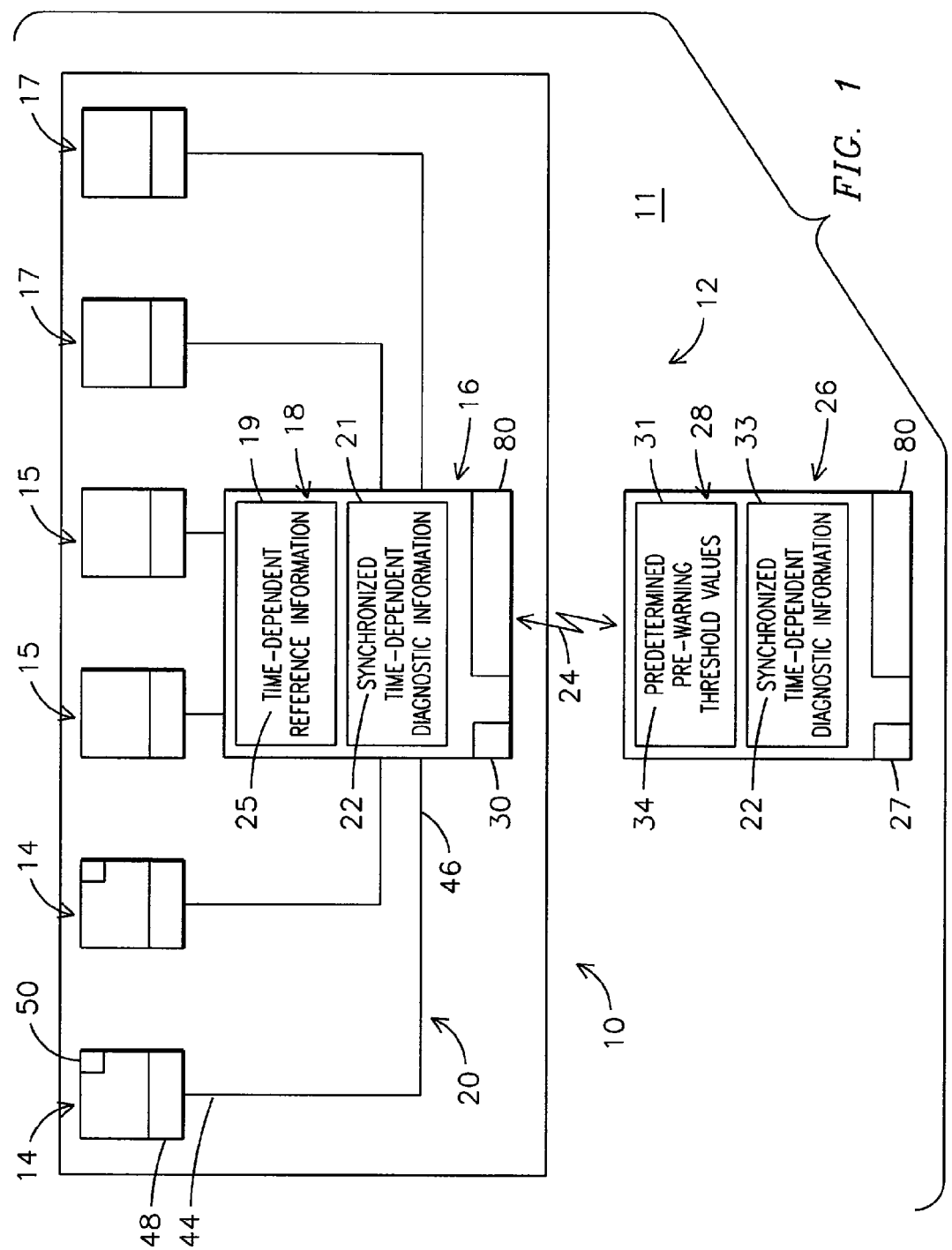
FIG. 1 is a schematic diagram of one embodiment of an integrated interface system operating in the synchronous mode.

As illustrated in FIG. 1, an integrated interface system 12 is illustrated for a plurality of systems 14, 15, 17 associated with locomotive 10 operation. The plurality of systems 14, 15, 17 associated with locomotive operation include a plurality of locomotive systems 15 installed on the locomotive 10 by the locomotive manufacturer, a plurality of third party systems 14 installed on the locomotive by a third party manufacturer, and a plurality of railroad systems 17. Although FIG. 1 illustrates a plurality of locomotive systems, third party systems, and railroad systems, only one locomotive system, third party system and/or railroad system may be utilized.

Figure 2:
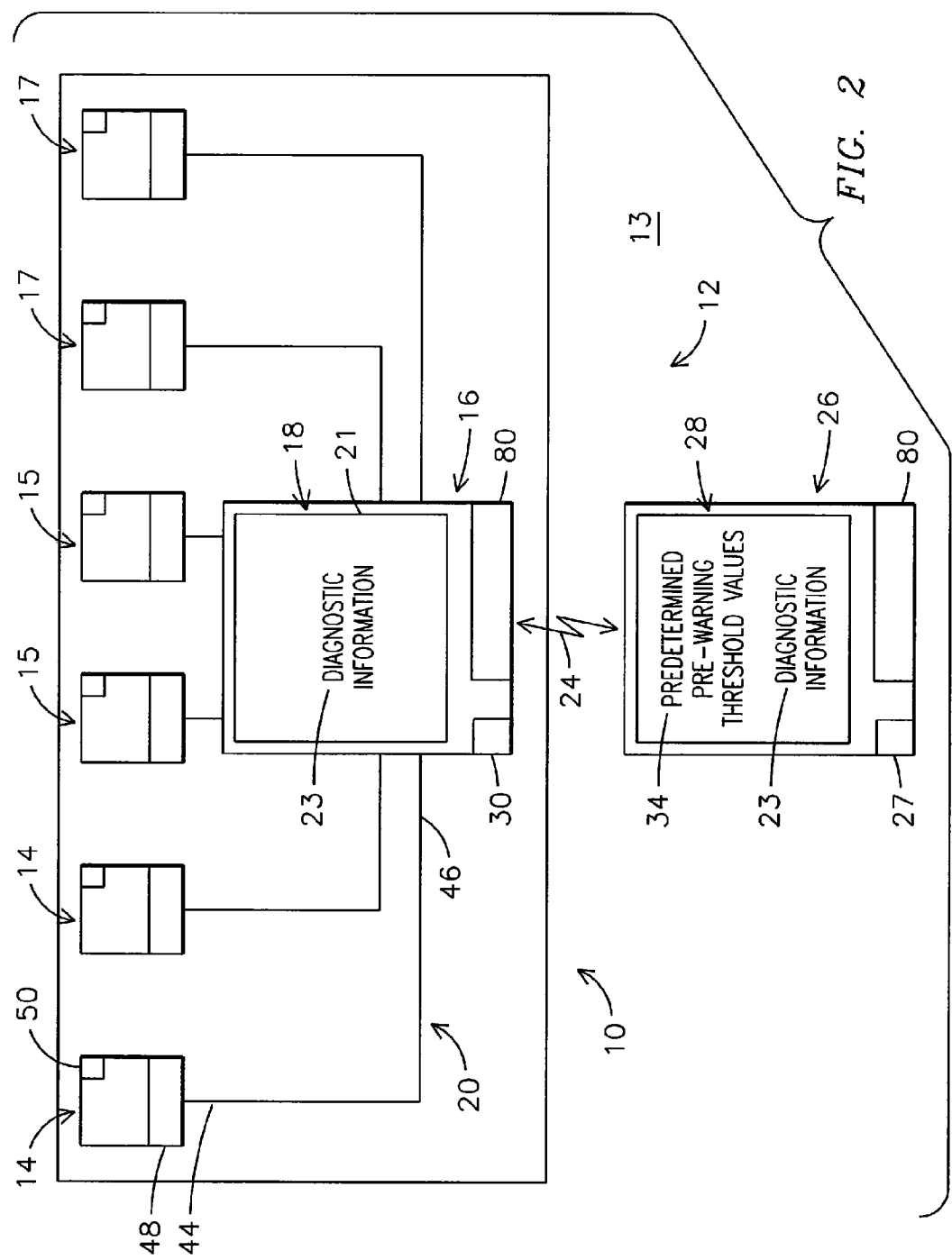
FIG. 2 is a schematic diagram of one embodiment of an integrated interface system operating in the display mode.

The integrated interface system 12 is switchable between a synchronous mode 11 (FIG. 1) and a display mode 13 (FIG. 2). The integrated interface system 12 operating in the synchronous mode includes a main controller 16 including a main display 18, and an interface 20 between each system 14, 15, 17 and the main controller. Each interface 20 communicates a respective set of time-dependent diagnostic information 22 for each system 14, 15, 17 to the main controller 16. As shown in FIG. 1, the main display 18 is segregated into a plurality of portions 19, 21, where each portion respectively displays synchronized time-dependent diagnostic information 22 for one or more systems 14, 15, 17 to simultaneously compare the respective synchronized time-dependent diagnostic information 22 of each system 14, 15, 17 in respective portions 19, 21 of the main display 18. Although FIG. 1 illustrates the main display 18 segregated into two portions, the main display may be segregated into more than two portions.

As illustrated in FIG. 1, the main display 18 includes a first portion 19 to display time-dependent reference information 25 of a first system 14, 15, 17 and a second portion 21 to display synchronized time-dependent diagnostic information 22 of each system 14, 15, 17 synchronized with the reference information. The menu panel 80 may be utilized to selectively adjust which systems 14, 15, 17 are displayed in each of the first and second portions 19, 21 of the main display 18, as well as the size of each of the first and second portions. By comparing the reference information 25 with the time-dependent diagnostic information 22, particular reference information may be established which is synchronized with time-dependent diagnostic information indicative of a malfunction in one or more systems 14, 15, 17.

In exemplary embodiments of the present invention, the first system 14, 15, 17 may include a clock system to establish reference time information, a position determining system to establish reference locomotive position information, a power system to establish reference locomotive power information, and an activation system to establish reference activation information of a locomotive device synchronized with time-dependent diagnostic information indicative of a malfunction in one system 14, 15, 17. For example, in the exemplary embodiment, as illustrated in FIG. 3, the first portion 19 displays particular reference locomotive power information (>3000 horsepower produced) from a first power system synchronized with time-dependent diagnostic information displayed in the second portion 21 indicative of a malfunction in one system. When the locomotive operator or manufacturer observes the first portion 19 in conjunction with the second portion 21 of the display, as illustrated in exemplary embodiment of FIG. 3, the particular cause of the malfunction may be narrowed down to locomotive power exceeding 3000 horsepower, for example. Without the synchronized first and second displays 19, 21 illustrated in the exemplary embodiment of FIG. 3, the locomotive operator or manufacturer are forced to speculate as to the effect of one particular locomotive or third party system on another locomotive or third party system.

As illustrated in FIG. 1, a remote terminal interface 24 between the main controller 16 and a remote terminal 26 includes a remote display 28. The remote terminal interface 24 simultaneously displays respective synchronized time-dependent diagnostic information 22 for one or more systems 14, 15, 17 into a plurality of segregated portions 31, 33 on the remote display 28. The segregated portions 31, 33 of the remote display 28 may respectively display the same diagnostic information as displayed on the segregated portions 19, 21 of the main display 18. Although FIG. 1 illustrates the remote display 28 segregated into two portions, the remote display may be segregated into more than two portions. Although FIG. 1 illustrates the remote display 28 displaying the same information as the main display 18, the remote display may display less, more or different information than the main display.

As further illustrated in FIG. 1, the main controller 16 further includes a storage device 30 to store the respective set of synchronized time-dependent diagnostic information 22 for each system 14, 15, 17. The time-dependent diagnostic information 22 is retrievable from the storage device 30, particularly when troubleshooting a malfunction or a pre-warning alert of a system 14, 15, 17. In separate embodiments of the integrated interface system 12, the main controller 16 or remote terminal 26 may retrieve the time-dependent diagnostic information 22 from the storage device 30 while troubleshooting a malfunction or a pre-warning alert of one or more systems 14, 15, 17, as discussed below.

Prior to a malfunction of one of the systems 14, 15, 17 of the locomotive 10, the integrated interface system 12 may detect a pre-warning status of one of the systems to repair the system before a subsequent malfunction occurs. A locomotive manufacturer may monitor each respective set of time-dependent diagnostic information 22 for all systems 14, 15, 17 on the remote display 28 with a respective set of predetermined pre-warning threshold values 34 stored in the storage device 30 for each set of time-dependent diagnostic information for all systems 14, 15, 17.

The remote terminal 26 may retrieve the predetermined pre-warning threshold values 34 from the storage device 30 over the remote terminal interface 24 and display the predetermined pre-warning threshold values on the remote display 28, along with the time-dependent diagnostic information 22. Additionally, the remote terminal 26 may include a remote controller 27 to automatically monitor each respective set of time-dependent diagnostic information 22 for all systems 14, 15, 17 with the respective predetermined pre-warning threshold values 34 stored in the storage device 30. Upon detecting a set of time-dependent diagnostic information 22 that exceeds a respective set of predetermined pre-warning threshold values 34, the locomotive manufacturer or remote terminal 26 extrudes pre-warning status information including pre-warning diagnostic information, the pre-warning time region, and an identification of the particular system with the pre-warning status.

The locomotive manufacturer and/or third party vendor subsequently arranges for the repair of the particular system based upon the pre-warning status information before the system malfunctions. The third party system manufacturer can determine when to issue a pre-warning alert and the particular pre-warning threshold values to be stored in a non-volatile memory. By reducing the number of Human Machine Interfaces (HMI) devices, and positioning a central main display with easy accessibility to be continuously monitored, the pre-warning alert action may be performed more efficiently than previous systems with HMI devices/panels for each system. Similarly, non-volatile information may be easily stored in the storage device, as it may be equipped to store such information on a large scale.

Similarly, a locomotive operator may monitor each respective set of time-dependent diagnostic information 22 for all systems 14, 15, 17 on the main display 18 with a respective set of predetermined pre-warning threshold values 34 stored in the storage device 30. The main controller 16 may display these predetermined pre-warning threshold values 34 on the main display 18, as with the time-dependent diagnostic information 22. Additionally, the main controller 16 may automatically monitor each respective set of time-dependent diagnostic information 22 for all systems 14, 15, 17 with the respective predetermined pre-warning threshold values 34.

Upon detecting a set of time-dependent diagnostic information 22 that exceeds a respective set of predetermined pre-warning threshold values 34, the locomotive operator or main controller 16 extrudes pre-warning status information, as described above, and transmits this pre-warning status information to the locomotive manufacturer over the remote terminal interface 24. The locomotive manufacturer and/or third party vendor subsequently arranges for the repair of the particular system based upon the pre-warning status information before the system malfunctions. The time-dependent diagnostic information is particularly useful to diagnose a possible malfunction of one of the systems, when used in conjunction with synchronized time-dependent diagnostic information of other systems. For example, the health of a cab signal detection system may be determined by evaluating an expected interference signal from a traction motor system.

In the event of a malfunction of a system 14, 15, 17, the main display 18 alerts the locomotive operator of the malfunction and the main controller 16 communicates malfunction information including an identification of the malfunctioning system and the malfunctioning time region through the remote terminal interface 24 to the remote display 28 to alert the locomotive manufacturer. Upon receiving the malfunction information through the remote terminal interface 24, the locomotive manufacturer may retrieve the diagnostic information 22 of the malfunctioning system during the malfunctioning time region from the storage device 30 through the remote terminal interface 24. The locomotive manufacturer and/or third party vendor subsequently arranges for the repair of the malfunctioned system. The storage device 30 of the main controller 18 is programmable to include filtering information for the systems 14, 15, 17 to filter the communication of malfunction information for one or more systems 14, 15, 17 based upon transient conditions in those systems 14, 15, 17. Each system 14, 15, 17 may detect a malfunction on a standalone basis and send the malfunction information and malfunctioning time to the main controller 16.

Each interface 20 between each system 14, 15, 17 and the main controller 16 may include any interface appreciated by one of skill in the art, such as a RS232-422 serial interface or an Ethernet interface, for example. Each interface 20 may include a dynamic coupling end 44 to the systems 14, 15, 17 for adapting to various systems and accommodating to future software modifications in the systems 14, 15, 17, as appreciated by one of skill in the art. Each interface 20 may further include a static coupling end 46 to the main controller 16 for operating independently of the dynamic coupling end 44 connection to the systems 14, 15, 17. The interface 20 may further include a general messaging protocol for permitting each system 14, 15, 17 to provide each respective set of time-dependent diagnostic information 22 to the main controller 16.

As shown in FIG. 1, each third party system 14 may include a third party box 48 for downloading a respective set of time-dependent diagnostic information 22 from a file location 50 within the third party system. The interface may extend between each of the third party boxes 48 and the main controller 16, and communicate the file location 50 to the main controller. Upon receiving the file location 50 through the interface 20, the main controller 16 may bypass the third party box 48 and download a respective set of time-dependent diagnostic information 22 directly from the file location 50.

The integrated interface system 12 operating in the display mode 13 (FIG. 2) includes each interface 20 operating independently of each system 14, 15, 17. Thus, each system does not need to be reconfigured from its original manufactured form to be coupled to each interface. Additionally, the main display 18 displays diagnostic information 23 for at least one system 14, 15, 17 using one of a plurality of functions. As illustrated in FIG. 2, a menu panel 80 is included on the main display 18 to provide selective display of diagnostic information 23 for one or more systems 14, 15, 17 using one of a plurality of functions on the main display 18. The plurality of functions may include time-synchronized diagnostic information 22 for a selectable system 14, 15, 17 of all systems, using selectable buttons on the menu panel 80. Additionally, as illustrated in the exemplary embodiment of FIG. 4, the plurality of functions may include a statistical function for displaying statistics of diagnostic information 23 for a selectable system A, B, C, D, E of the systems 14, 15, 17 using corresponding buttons on the menu panel 80.

Upon selecting one of the systems 14, 15, 17 using the buttons of the menu panel 80, the statistical function may display one of several statistics of the diagnostic information of the selected system on the main display 18. In an exemplary embodiment of the integrated interface system 12, upon selecting one system 12 using a button from the menu panel 80, an average function may display the time average of the diagnostic information of the system 12 on the main display over a particular predetermined time period, such as every minute, for example.

FIG. 5 illustrates one embodiment of a method 100 for interfacing a plurality of systems 14, 15, 17 associated with locomotive operation to a main controller 18 of a locomotive 12. The method 100 is switchable to a synchronous mode 11 and begins (block 101) by providing (block 102) an interface 20 between each system 14, 15, 17 and the main controller 16 including a main display 18. The method 100 further includes communicating (block 104) a respective set of time-dependent diagnostic information 22 for each system 14, 15, 17 from each system over each interface 20 to the main controller 16. Additionally, the method includes segregating (block 106) the main display 18 into a plurality of portions 19, 21, where each portion respectively displays synchronized time-dependent diagnostic information 22 for one or more systems 14, 15, 17. Upon segregating the main display, the method includes simultaneously comparing (block 108) the respective synchronized time-dependent diagnostic information 22 of each system 14, 15, 17 within respective portions 19, 21 of the main display 18 before ending at block 110.

The method may further interface a plurality of systems 14, 15, 17 associated with locomotive operation to a remote terminal 26. The method is switchable to the synchronous mode 11 including providing a remote terminal interface 24 between the main controller 16 and the remote terminal 26 including a remote display 28. The method further includes communicating each set of time-dependent diagnostic information 22 for the plurality of systems 14, 15, 17 from the main controller 16 over the remote terminal interface 24 to the remote terminal 26. More particularly, the method includes segregating the remote display 28 into a plurality of portions 31, 33, where each portion respectively displays synchronized time-dependent diagnostic information 22 for each system 14, 15, 17. Additionally, the method includes simultaneously comparing the respective synchronized time-dependent diagnostic information 22 of each system 14, 15, 17 within respective portions 31, 33 of the remote display 28.

Based on the foregoing specification, one embodiment of the invention may be implemented using computer programming or engineering techniques including computer software, firmware, hardware or any combination or subset thereof, wherein the technical effect is to interface a plurality of systems associated with locomotive operation to a main controller of a locomotive. Any such resulting program, having computer-readable code devices, may be embodied or provided within one or more computer-readable media, thereby making a computer program product, i.e., an article of manufacture, according to one embodiment of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the several embodiments of the disclosed invention. An apparatus for making, using or selling the embodiment of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the embodiment of the invention.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insignificant differences from the literal languages of the claims.

That which is claimed:

1. An integrated interface system for a plurality of systems associated with vehicle operation, comprising:
   a main controller including a main display; and
   an interface between each system of said plurality of systems and said main controller, each interface configured to communicate a respective set of time-dependent diagnostic information for each system of said plurality of systems to said main controller;
   wherein the integrated interface system is configured to operate in a synchronous mode comprising said main display being configured to segregate into a plurality of portions, each portion is configured to respectively display synchronized time-dependent diagnostic information for at least one system of said plurality of systems, to simultaneously compare the respective synchronized time-dependent diagnostic information of each at least one system of said plurality of systems in respective portions of said main display.

2. The integrated interface system according to claim 1, wherein said main display includes a first portion configured to display time-dependent reference information of a first system of said plurality of systems and a second portion configured to display synchronized time-dependent diagnostic information of each of said at least one system of said plurality of systems synchronized with said reference information, to establish reference information synchronized with time-dependent diagnostic information indicative of a malfunction in one of said at least one system of said plurality of systems.

3. The integrated interface system according to claim 2, wherein said vehicle is a locomotive, wherein said first system includes a clock system configured to establish reference time information, a position determining system configured to establish reference locomotive position information, a power system configured to establish reference locomotive power information, or an activation system configured to establish reference activation information of a locomotive device synchronized with time-dependent diagnostic information indicative of a malfunction in one system of said plurality of systems.

4. The integrated interface system according to claim 1, further comprising a remote terminal interface between said main controller and a remote terminal including a remote display, said remote terminal display configured to simultaneously display respective synchronized time-dependent diagnostic information for at least one system of said plurality of systems into a plurality of segregated portions on said remote display.

5. The integrated interface system according to claim 4, wherein said main controller further includes a storage device configured to store said respective set of synchronized time-dependent diagnostic information for each of said plurality of systems for retrieval by said remote terminal through said remote terminal interface upon troubleshooting a subsequent malfunction of one of said plurality of systems.

6. The integrated interface system according to claim 5, wherein said vehicle is a locomotive, wherein a locomotive manufacturer monitors each respective set of synchronized time-dependent diagnostic information for said plurality of systems on said remote display with predetermined pre-warning threshold values for said time-dependent diagnostic information for each of said plurality of systems.

7. The integrated interface system according to claim 5, wherein said vehicle is a locomotive, wherein said main display is configured to alert a locomotive operator of said malfunction of at least one system of said plurality of systems, said main controller is configured to communicate malfunction information including an identification of at least one malfunctioning system of said plurality of systems and a respective malfunctioning time through said remote terminal interface to said remote display to alert a locomotive manufacturer.

8. The integrated interface system according to claim 7, wherein said storage device of said main controller is programmable to include filtering information for said plurality of systems to filter said communication of malfunction information for at least one system of said plurality of systems based upon transient conditions in said one system of said plurality of systems.

9. The integrated interface system according to claim 7, wherein upon said locomotive manufacturer having received said malfunction information through said remote terminal interface, said locomotive manufacturer retrieves diagnostic information of said at least one malfunctioning system of said plurality of systems during said respective malfunctioning time from said storage device of said main controller through said remote terminal interface to said remote display.

10. The integrated interface system according to claim 1, wherein said main controller further includes a storage device configured to store said respective set of synchronized time-dependent diagnostic information for each of said plurality of systems for retrieval upon troubleshooting a subsequent malfunction of one of said plurality of systems.

11. The integrated interface system according to claim 10, wherein said vehicle is a locomotive, wherein a locomotive operator monitors each respective set of synchronized time-dependent diagnostic information for said plurality of systems on said main display with predetermined pre-warning threshold values for said time-dependent diagnostic information for each of said plurality of systems.

12. An integrated interface system for a plurality of systems associated with vehicle operation, comprising:
   a main controller including a main display; and
   an interface between each system of said plurality of systems and said main controller, each interface configured to communicate a respective set of time-dependent diagnostic information for each system of said plurality of systems to said main controller;
   wherein said integrated interface system is configured to operate in a display mode where each interface is configured to operate independently of each system of said plurality of systems, and said main display being configured to display diagnostic information for at least one system of said plurality of systems using one of a plurality of functions.

13. The integrated interface system according to claim 12, wherein said vehicle is a locomotive, wherein said plurality of systems associated with locomotive operations comprises at least one locomotive system installed on the locomotive by a locomotive manufacturer and at least one third party system installed on the locomotive by a third party manufacturer.

14. The integrated interface system according to claim 12, further comprising a menu panel to select said diagnostic information for at least one of said plurality of systems to be displayed in one of a plurality of functions on said main display.

15. The integrated interface system according to claim 14, wherein said plurality of functions comprise time-synchronized diagnostic information for a selectable system of said plurality of systems on said menu panel.

16. The integrated interface system according to claim 14, wherein said plurality of functions comprise a statistical function for displaying statistics of said diagnostic information for at least one selectable system of said plurality of systems on said menu panel.

17. A method for interfacing a plurality of systems associated with vehicle operation to a main controller of a vehicle, comprising:
   providing at least one interface between each of said plurality of systems and said main controller including a main display;
   communicating a respective set of time-dependent diagnostic information for each system of said plurality of systems from each system of said plurality of systems over each of said at least one interface to said main controller,
   wherein said communicating is performed in a synchronous mode;
   segregating said main display into a plurality of portions, each portion for respectively displaying synchronized time-dependent diagnostic information for at least one system of said plurality of systems; and
   simultaneously comparing the respective synchronized time-dependent diagnostic information of each at least one system of said plurality of systems within respective portions of said main display.

18. The method according to claim 17, wherein said vehicle is a locomotive, further comprising:
   interfacing a plurality of systems associated with locomotive operation to a remote terminal from said locomotive;
   providing a remote terminal interface between said main controller and a remote terminal including a remote display;
   communicating each set of time-dependent diagnostic information for said plurality of systems from said main controller over said remote terminal interface to said remote terminal;
   segregating said remote display into a plurality of portions, each portion for respectively displaying synchronized time-dependent diagnostic information for at least one system of said plurality of systems; and
   simultaneously comparing the respective synchronized time-dependent diagnostic information of each at least one system of said plurality of systems within respective portions of said remote display.

19. The method according to claim 18, further comprising:
   storing said respective set of synchronized time-dependent diagnostic information for each of said plurality of systems in a storage device within said main controller; and
   retrieving said respective set of synchronized time-dependent diagnostic information from said storage device by said remote terminal through said remote terminal interface upon troubleshooting a subsequent malfunction of one of said plurality of systems.

20. The method according to claim 17, wherein said segregating said main display into a plurality of portions comprises segregating said main display into a first portion for displaying time-dependent reference information of a first system of said plurality of systems synchronized with said reference information and segregating said main display into a second portion for displaying synchronized time-dependent diagnostic information of each of said at least one system of said plurality of systems, and wherein said method further comprises establishing reference information synchronized with time-dependent diagnostic information indicative of a malfunction in one of said at least one system of said plurality of systems.

21. The method according to claim 20, wherein said vehicle is a locomotive, wherein said first system includes one of a clock system for establishing reference time information, position determining system for establishing reference locomotive position information, power system for establishing reference locomotive power information, and activation system for establishing reference activation information of a locomotive device synchronized with time-dependent diagnostic information indicative of a malfunction in one system of said plurality of systems.

22. The method according to claim 17, further comprising:
   storing said respective set of synchronized time-dependent diagnostic information for each of said plurality of systems in a storage device within said main controller; and
   retrieving said respective set of synchronized time-dependent diagnostic information upon troubleshooting a subsequent malfunction of one of said plurality of systems.

23. A method for interfacing a plurality of systems associated with vehicle operation to a main controller of a vehicle, comprising:
   providing at least one interface between each of said plurality of systems and said main controller including a main display;
   communicating a respective set of time-dependent diagnostic information for each system of said plurality of systems from each system of said plurality of systems over each of said at least one interface to said main controller;

providing a switchable display mode, wherein said display mode comprises operating each interface independently of each system of said plurality of systems, and displaying diagnostic information for at least one system of said plurality systems on said main display using one of a plurality of functions.

24. The method according to claim 23, wherein said vehicle is a locomotive, wherein said plurality of systems associated with locomotive operations comprise at least one locomotive system installed on the locomotive by the locomotive manufacturer and at least one third party system installed on the locomotive by a third party manufacturer.

25. The method operating in said display mode according to claim 23, further comprising selectively displaying said diagnostic information for at least one of said plurality of systems in one of a plurality of functions on said main display using a menu panel.

26. The method operating in said display mode according to claim 25, wherein said plurality of functions comprise time-synchronized diagnostic information for a selectable system of said plurality of systems on said menu panel.

27. Computer readable product containing program instructions for interfacing a plurality of systems associated with locomotive operation to a main controller of a locomotive, the computer readable product comprising:

a computer program code for communicating a respective set of time-dependent diagnostic information for each system of said plurality of systems from each system of said plurality of systems over each of at least one interface to said main controller, each of at least one interface positioned between each of said plurality of systems and said main controller including a main display;

a computer program code for segregating said main display into a plurality of portions, each portion for respectively displaying synchronized time-dependent diagnostic information for at least one system of said plurality of systems; and a computer program code for simultaneously comparing the respective synchronized time-dependent diagnostic information of each at least one system of said plurality of systems within respective portions of said main display.

* * * * *